United States Patent [19]
Kitou et al.

[11] Patent Number: 6,025,680
[45] Date of Patent: Feb. 15, 2000

[54] HORIZONTAL DEFLECTION CIRCUIT AND CATHODE RAY TUBE DISPLAY APPARATUS USING THE SAME

[75] Inventors: Kouji Kitou; Ikuya Arai, both of Yokohama; Yuji Sano, Zushi, all of Japan

[73] Assignee: Hitachi, Ltd., Tokyo, Japan

[21] Appl. No.: 08/177,975

[22] Filed: Jan. 6, 1994

[30] Foreign Application Priority Data

Jan. 6, 1993 [JP] Japan ..................................... 5-000547

[51] Int. Cl.[7] ...................................................... G09G 1/04
[52] U.S. Cl. .......................................... 315/371; 315/408
[58] Field of Search ................................... 315/408, 371, 315/391, 395

[56] References Cited

U.S. PATENT DOCUMENTS

| | | | |
|---|---|---|---|
| 4,540,933 | 9/1985 | Teuling | 315/411 |
| 4,645,985 | 2/1987 | Dietz | 315/371 |
| 4,733,141 | 3/1988 | Watanuki | 315/371 |
| 4,871,951 | 10/1989 | Teuling | 315/408 |

FOREIGN PATENT DOCUMENTS

62-31269  2/1987  Japan .
4-74065   3/1992  Japan .

*Primary Examiner*—Gregory C. Issing
*Attorney, Agent, or Firm*—Antonelli, Terry, Stout & Kraus, LLP

[57] ABSTRACT

A horizontal deflection circuit including a horizontal deflection output circuit and a horizontal sawtooth wave current generation circuit. The horizontal output deflection circuit has a horizontal deflection coil and an S-shape capacitor connected in series with the horizontal deflector coil for supplying a horizontal deflection current to the horizontal deflector coil and the S-shape capacitor in accordance with a horizontal drive pulse. The horizontal sawtooth wave current generation circuit supplies a horizontal sawtooth wave current to the S-shape capacitor in a direction opposite to the horizontal deflection current and has a power voltage thereof controlled so that a difference current between the horizontal deflection current and the horizontal sawtooth wave current flowing in the S-shape capacitor has an amplitude proportional to a horizontal deflection frequency raised to a power N, where N has a value greater than 1, thereby enabling continuous S-shape correction independent of changes in the horizontal deflection frequency. A display apparatus utilizing the horizontal deflection circuit provides for S-shape correction with a maximum linearity error at a constant value of less than 5%.

17 Claims, 11 Drawing Sheets

HORIZONTAL DEFLECTION CIRCUIT AND CATHODE RAY TUBE DISPLAY APPARATUS USING THE SAME

FIELD OF THE INVENTION

The present invention relates to a horizontal deflection circuit used in multi-scan display apparatus, such as display apparatus for computers, and is capable of dealing with various horizontal deflection frequencies.

BACKGROUND OF THE INVENTION

In recent years, multi-scan display apparatus each capable of dealing with various horizontal deflection frequencies are becoming prevalent with the intention of enhancing the user's operationability and the efficiency of production lines.

Horizontal deflection circuits of these multi-scan display apparatus undergo power voltage control or the like depending on the horizontal deflection frequency so as to be compatible with various horizontal deflection frequencies. In the control scheme, the horizontal S-shape correction circuit for absorbing the difference between the curvature of horizontal deflection and the curvature of the horizontal display plane is designed to provide the multi-scan ability through the switching of a plurality of S-shape capacitors in response to the horizontal deflection frequency, in general. Such technique is described in Japanese Patent Application Laid-Open No. 4-74065.

Another proposed technique is a continuous S-shape correction circuit based on two saturable reactors connected in series to the horizontal deflector coil (the continuous S-shape correction mentioned here is the S-shape correction which can take place at a constant accuracy against changes in the horizontal deflection frequency). Such technique is described in Japanese Patent Application Laid-Open No. 62-31269.

A further proposed technique is described in U.S. Pat. No. 4,645,985 wherein an automatic S-correction circuit for a deflection circuit includes an active source of generally sawtooth wave current having an amplitude that is proportional to the deflection frequency.

However, among the above-mentioned prior art arrangements, the scheme of switching S-shape capacitors makes step variations of capacitance, resulting in a large correction error for some horizontal deflection frequency range, i.e., a large linearity error which varies. It is necessary to increase the number of steps for the reduction of the correction error, resulting in an increased circuit scale and circuit cost.

The scheme based on saturable reactors causes the horizontal deflection circuit to consume increased power due to the distribution of the power voltage to the saturable reactors, resulting in a degraded efficiency of the horizontal deflection circuit. Moreover, while this scheme provides a smaller linearity error which is a constant value, such value is about 5% because the characteristics of the saturatable reactors differ from one another and from the ideal characteristics.

As to the scheme when the amplitude of the sawtooth current is proportional to the deflection frequency, here again a variable linearity error results.

SUMMARY OF THE INVENTION

A primary object of the present invention is to solve the foregoing prior art deficiencies and provide a horizontal deflection circuit which is capable of performing the multi-scan compatible, continuous S-shape correction efficiently.

Another object of the present invention is to provide a horizontal deflection circuit which is capable of performing the multi-scan compatible, continuous S-shape correction accurately even for higher horizontal deflection frequencies.

A further object of the present invention is to provide a horizontal deflection circuit which is capable of performing the multi-scan compatible linearity correction and continuous S-shape correction at the same time.

A still further object of the present invention is to provide a display apparatus utilizing an S-shape correction circuit for correcting linearity error enabling a maximum linearity error of less than 5% at a substantially constant value irrespective of the horizontal deflection frequency.

In accordance with the present invention, there is provided a horizontal sawtooth wave current generation circuit in the horizontal deflection circuit, by which a horizontal sawtooth wave current is supplied to the S-shape capacitor in serial connection with the horizontal deflector coil in a direction opposite to the horizontal deflection current, and the power voltage of the horizontal sawtooth wave current generation circuit is controlled such that the amplitude of the difference current flowing in the S-shape capacitor is proportional to the square of the horizontal deflection frequency.

According to a feature of the present invention, two phase-locked loop circuits are provided in the horizontal deflection circuit, by which the horizontal sawtooth wave current of the horizontal sawtooth wave current generation circuit become in-phase with the horizontal deflection current, thereby causing the horizontal sawtooth wave current to be in-phase with the horizontal deflection current irrespective of the horizontal deflection frequency.

According to another feature of the present invention, there is provided in the horizontal deflection circuit, a voltage controlled delay circuit for the phase-locked loop circuit which deals with the phases of the horizontal sync signal and the horizontal sawtooth wave current of the horizontal sawtooth wave current generation circuit, and the amount of delay of the voltage controlled delay circuit is controlled such that the phase difference of the horizontal sawtooth wave current from the horizontal deflection current is a constant proportion irrespective of the horizontal deflection frequency.

In accordance with the present invention, the horizontal sawtooth wave current generation circuit is virtually the same circuit arrangement as the horizontal deflection output circuit, consisting of an output transistor, a damper diode, a resonance capacitor, a coil, etc., and it supplies a horizontal sawtooth wave current to the S-shape capacitor in serial connection with the horizontal deflector coil in the direction opposite to the horizontal deflection current. The current flowing in the S-shape capacitor is the difference of these two currents, and the power voltage of the horizontal sawtooth wave current generation circuit is controlled in response to the horizontal deflection frequency such that the amplitude of the difference current is proportional to the square of the horizontal deflection frequency. As a result, the horizontal parabolic voltage of the S-shape capacitor is proportional to the horizontal deflection frequency, and the ratio to the average voltage of the S-shape capacitor (power voltage of the horizontal output circuit) becomes constant irrespective of the horizontal deflection frequency. Consequently, a horizontal deflection circuit capable of performing the multi-scan compatible, continuous S-shape correction is accomplished.

According to a feature of the present invention, each of the two phase-locked loop circuits consists of a phase detector, a low-pass filter, a voltage-controlled oscillator, etc., with the first phase detector being supplied with a voltage, which is derived from the collector pulse of the horizontal output transistor and divided by resistors, and a horizontal sync signal and with the second phase detector being supplied with a voltage which is derived from the collector pulse of the output transistor of the horizontal sawtooth wave current generation circuit and divided by resistors. As a result of the operation of the phase-locked loop circuits, the horizontal sawtooth wave current of the horizontal sawtooth wave current generation circuit is always in-phase with the horizontal deflection current flowing in the horizontal deflector coil irrespective of the horizontal deflection frequency. Because of the horizontal sawtooth wave current being in-phase with the horizontal deflection current irrespective of the horizontal deflection frequency, a horizontal deflection circuit capable of performing the multi-scan compatible, continuous S-shape correction accurately even at higher horizontal deflection frequencies is obtainable.

According to another feature of the present invention, the voltage controlled delay circuit is supplied with a pulse voltage which is derived from the collector pulse of the output transistor of the horizontal saw-tooth wave current generation circuit and divided by resistors so that it has a delay depending on the control voltage, and the output voltage is applied to the above-mentioned second phase detector. By application of such a control voltage of the voltage controlled delay circuit to make a constant proportion of the phase difference between the horizontal sawtooth wave current and horizontal deflection current irrespective of the horizontal deflection frequency, the horizontal parabolic voltage of the S-shape capacitor becomes asymmetric for its right and left portions, and a horizontal deflection circuit capable of performing the multi-scan compatible, linearity correction and continuous S-shape correction at the same time is obtainable.

These and other objects, features, and advantages of the present invention will become more apparent from the following description when taken in conjunction with the accompanying drawings which show, for purposes of illustration only, several embodiments of the present invention.

DESCRIPTION OF THE PREFERRED EMBODIMENTS

Figure 1:
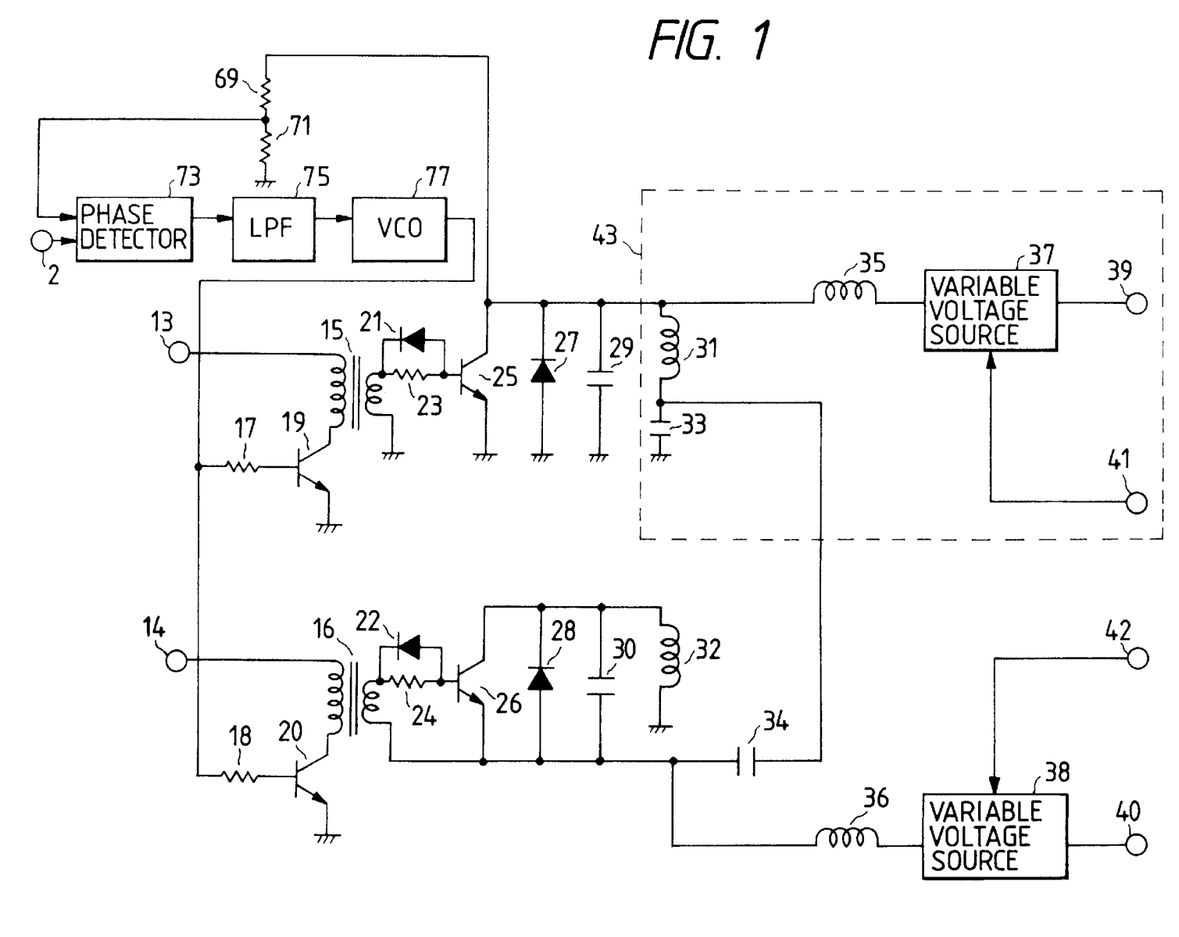
FIG. 1 is a schematic diagram showing a principal portion of a horizontal deflection circuit according to an embodiment of the present invention.
Figure 2:
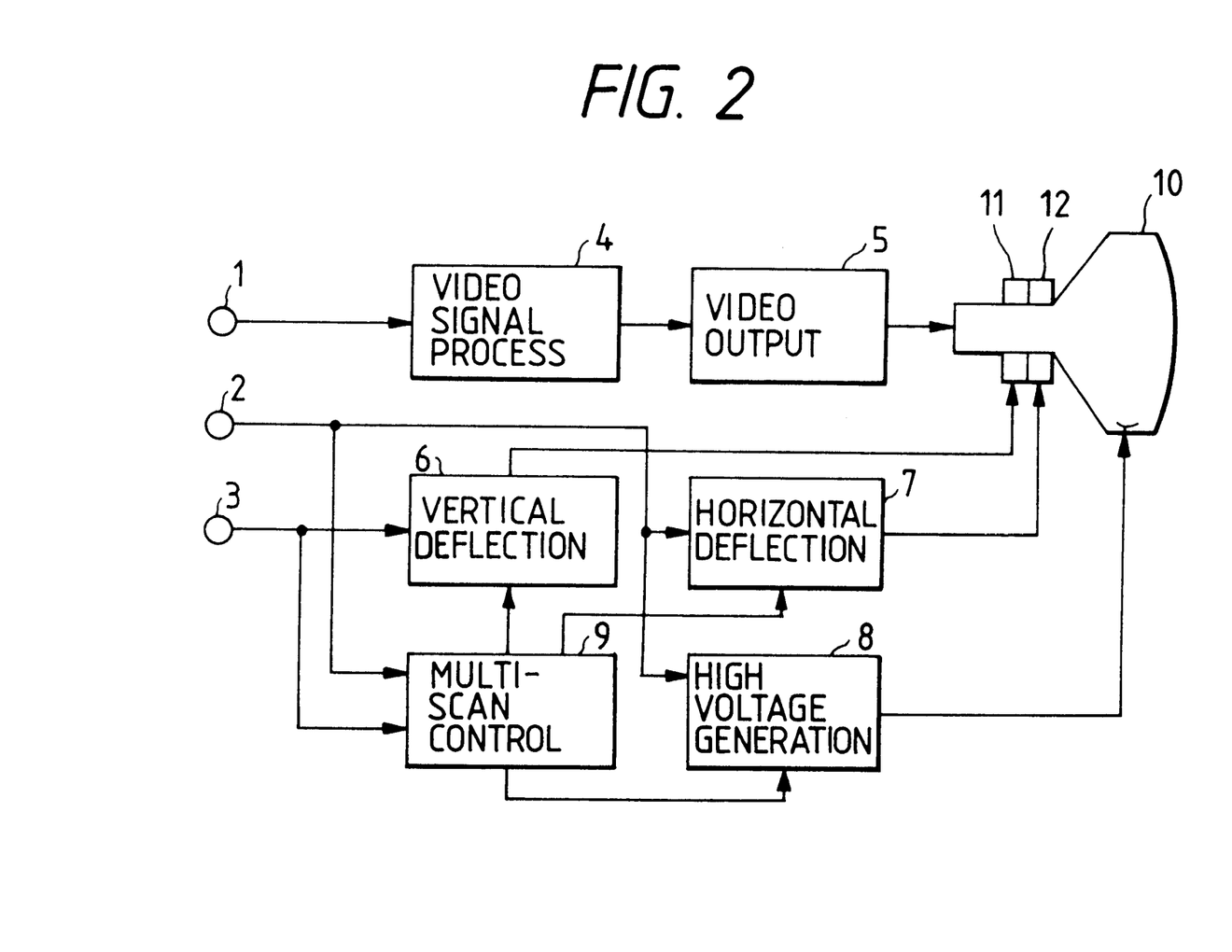
FIG. 2 is a block diagram showing a multi-scan display apparatus utilizing a horizontal deflection circuit according to the present invention.

Referring now to the drawings wherein like reference numerals are utilized to designate like parts throughout the several views, FIG. 1 is a schematic diagram showing a principal portion of the horizontal deflection circuit in accordance with an embodiment of the present invention, and FIG. 2 is a block diagram showing a multi-scan display apparatus incorporating the horizontal deflection circuit of the present invention.

Initially, the arrangement of the multi-scan display apparatus shown in FIG. 2 will be explained. In FIG. 2, reference numeral 1 denotes a video signal input terminal, 2 is a horizontal sync signal input terminal, 3 is a vertical sync signal input terminal, 4 is a video signal processing circuit, 5 is a video output circuit, 6 is a vertical deflection circuit, 7 is a horizontal deflection circuit, 8 is a high voltage generation circuit, 9 is a multi-scan control circuit, 10 is a cathode-ray tube such as a Braun tube, 11 is a vertical deflector coil, and 12 is a horizontal deflector coil.

A video signal received on the terminal 1 is subjected to various adjustments by the video signal processing circuit 4 and thereafter subjected to voltage amplification by the video signal output circuit 5. The resulting signal provided with the necessary voltage amplitude is applied to the cathode of the Braun tube 10. A horizontal sync signal received on the terminal 2 is applied to the horizontal deflection circuit 7 and high voltage generation circuit 8 so that these circuits 7 and 8 provide horizontal synchronization. Similarly, a vertical sync signal received on the terminal 3 is applied to the vertical deflection circuit 6 providing vertical synchronization. The vertical deflection circuit 6 supplies a vertical deflection current to the vertical deflector coil 11 and the horizontal deflection circuit 7 supplies a horizontal deflection current to the horizontal deflector coil 12, thereby forming rasters on the display screen of the Braun tube 10.

The multi-scan control circuit 9 detects the horizontal frequency and vertical frequency from the received horizontal sync signal and vertical sync signal and delivers necessary control signals to the vertical deflection circuit 6, horizontal deflection circuit 7 and high voltage generation circuit 8 so that these circuits 6, 7 and 8 are made multi-scan compatible. There are two schemes for the multi-scan control circuit 9. One scheme is based on an analog circuit, such as a frequency-to-voltage conversion circuit, by which the control signals are produced, and another scheme is based on a microcomputer, by which digital data in the memory is converted into the analog control signals.

In FIG. 1, reference numerals 13 and 14 denote drive power input terminals, 15 and 16 are drive transformers, 17, 18, 23 and 24 are resistors, 19 and 20 are drive transistors, 21 and 22 are diodes, 25 is a horizontal output transistor, 26 is an output transistor, 27 and 28 are damper diodes, 29 and 30 are resonance capacitors, 31 is a horizontal deflector coil, 32 is a coil, 33 is an S-shape capacitor, 34 is a coupling capacitor, 35 and 36 are choke coils, 37 is a positive variable-voltage source, 38 is a negative variable-voltage source, 39 is a positive power voltage input terminal, 40 is a negative power voltage input terminal, 41 and 42 are control voltage input terminals 69 and 71 are resistors, 73 is a phase detector, 75 is a low-pass filter, and 77 is a voltage-controlled oscillator.

The phase detector 73 receives a voltage which is the collector pulse of the horizontal output transistor 25 divided by the resistors 69 and 71 and the horizontal sync signal supplied to the horizontal sync signal input terminal 2, and a phase-locked loop circuit including the low-pass filter 75 and the voltage-controlled oscillator 77 which brings both inputs in phase with each other is formed.

The drive transistors 19 and 20 in response to the output of the oscillator 77 via resistors 17 and 18 operate in a switching mode to drive the horizontal output transistor 25 and output transistor 26 through the drive transformers 15 and 16. As a result, the horizontal output transistor 25 and output transistor 26 operate in a switching mode, and a horizontal deflection current and horizontal sawtooth wave current flow through the horizontal deflector coil 31 and coil 32 by the functions of the damper diodes 27 and 28 and the resonance capacitors 29 and 30, respectively. The horizontal sawtooth wave current flowing in the coil 32 flows to the S-shape capacitor by way of the coupling capacitor 34, which has the horizontal parabolic wave amplitude varied by the current, and the multi-scan compatible, continuous S-shape correcting operation is implemented.

The power voltage applied to the positive power input terminal 39 is adjusted to the positive power voltage corresponding to the horizontal frequency by the variable voltage source 37 in accordance with the control voltage received on the control voltage input terminal 41, and it is supplied to the collector of the horizontal output transistor 25 and the like through the choke coil 35. Similarly, the power voltage applied to the negative power input terminal 40 is adjusted to the negative power voltage corresponding to the horizontal frequency by the variable voltage source 38 in accordance with the control voltage received on the control voltage input terminal 42, and it is supplied to the emitter of the horizontal output transistor 26 and the like through the choke coil 36.

Figure 3A:
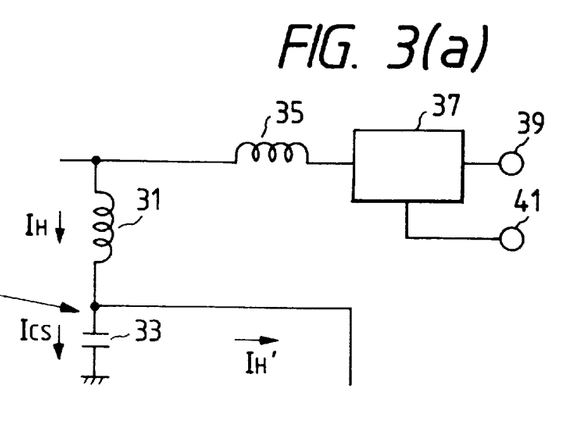
FIGS. 3(a) and 3(b) show a schematic diagram of the block and a voltage waveform 43 of FIG. 1, respectively, for explaining the operation thereof.
Figure 3B:
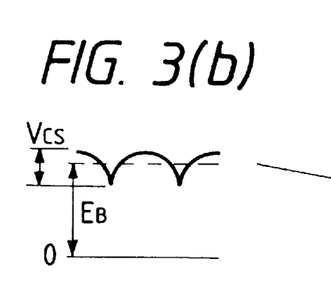
Figure 4:
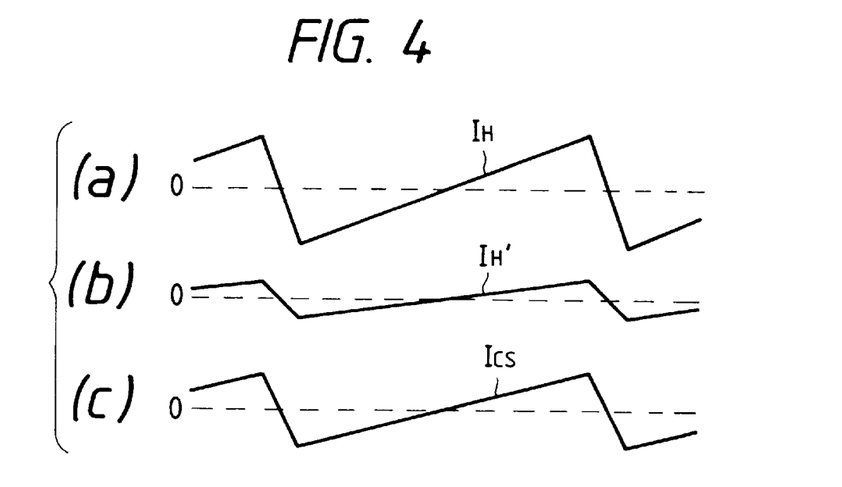
FIG. 4 is a waveform diagram showing the current waveforms (a)–(c) at principal portions of FIG. 3(a)

The multi-scan compatible, continuous S-shape correcting operation will be explained in detail with reference to FIGS. 3(a) and 3(b), FIG. 4 and FIGS. 5(a) and 5(b). FIG. 3 is a schematic diagram of the block 43 shown in broken line of the circuit shown in FIG. 1. The horizontal deflector coil 31 has the horizontal deflection current $I_H$ shown by waveform (a) in FIG. 4, and the coil 32 has the horizontal sawtooth wave current $I_H$, shown by waveform (b) in FIG. 4. As a result, the horizontal sawtooth wave current $I_{CS}$ flowing in the S-shape capacitor 33 becomes the horizontal deflection current $I_H$ subtracted by the horizontal sawtooth wave current $I_H'$ as shown by waveform(c) in FIG. 4. The voltage appearing across the S-shape capacitor 33 becomes a horizontal parabolic wave having a mean value equal to the output voltage $E_B$ of the variable voltage source 37 and an amplitude equal to $V_{CS}$ as shown in FIG. 3(b).

Figure 5A:
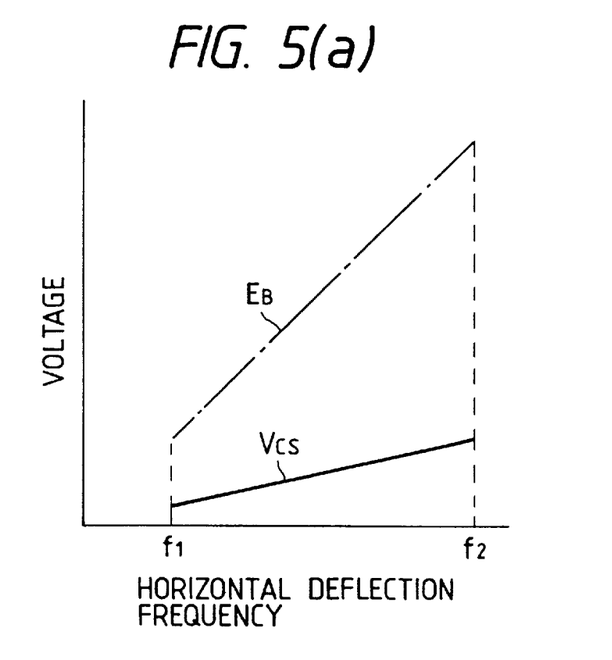
FIGS. 5(a) and 5(b) are characteristic diagrams showing, respectively, the voltages and currents with respect to the horizontal deflection frequency according to the present invention.

In order for the horizontal deflection current to have a constant amplitude with respect to the horizontal deflection frequency, it is necessary to make the output voltage $E_B$ of the variable voltage source 37 proportional to the horizontal deflection frequency as shown in FIG. 5(a).

In order to implement the optimal S-shape correction irrespective of the horizontal deflection frequency (i.e., S-shape correction at a constant accuracy), it is necessary to make constant a ratio between the amplitude $V_{CS}$ of the horizontal parabolic wave and the voltage $E_B$ of the variable voltage source 37 as shown in FIG. 5(a). Namely, it is necessary for the horizontal parabolic wave amplitude $V_{CS}$ to be proportional to the horizontal deflection frequency. The horizontal parabolic wave amplitude VCS is expressed by the following Expression (1), and there are two methods of making the amplitude $V_{CS}$ proportional to the horizontal deflection frequency. One method is to make the horizontal sawtooth wave current $I_{CS}$ flowing in the S-shape capacitor 33 proportional to the square of the horizontal deflection frequency, and another method is to make the capacitance $C_S$ of the S-shape capacitor 33 inversely proportional to the square of the horizontal deflection frequency.

$$V_{CS}=\gamma \cdot I_{CS}/(C_S \cdot f_H) \tag{1}$$

where $\gamma$ is a proportional constant, $C_S$ is the capacitance of the S-shape capacitor, and $f_H$ is the horizontal deflection frequency.

Among the above-mentioned two methods, the latter method is already adopted in the S-shape capacitor switching scheme in the foregoing prior art, while the former method is adopted by the present invention.

Figure 5B:
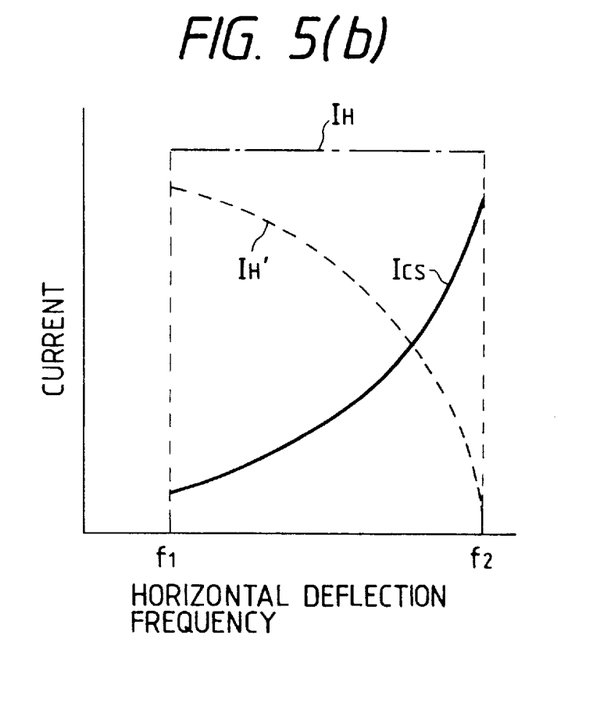

In order to make the horizontal sawtooth wave current $I_{CS}$ flowing in the S-shape capacitor 33 proportional to the square of the horizontal deflection frequency, with the horizontal deflection current $I_H$ being kept constant with respect to the horizontal deflection frequency, as shown in FIG. 5(b), the variable voltage source 38 in the circuit of FIG. 1 is operated in accordance with the control voltage received on the control voltage terminal 42 to produce a negative power voltage corresponding to the horizontal deflection frequency, thereby making the horizontal sawtooth wave current $I_H'$ to be inversely proportional to the square of the horizontal deflection frequency as shown in FIG. 5(b). As a result, the horizontal parabolic wave amplitude $V_{CS}$ is proportional to the horizontal deflection frequency, and a horizontal deflection circuit capable of performing the multi-scan compatible, continuous S-shape correction is obtainable.

Although the above explanation is directed to the case where $I_{CS}$ is proportional to the square of the horizontal deflection frequency, i.e., $I_{CS} f_H^2$ $I_{CS}$ can be made proportional to $f_H^N$, i.e., $I_{CS} f_H^N$ where N is value greater than 1, and preferably a value between 1 and 3.

Figure 6:
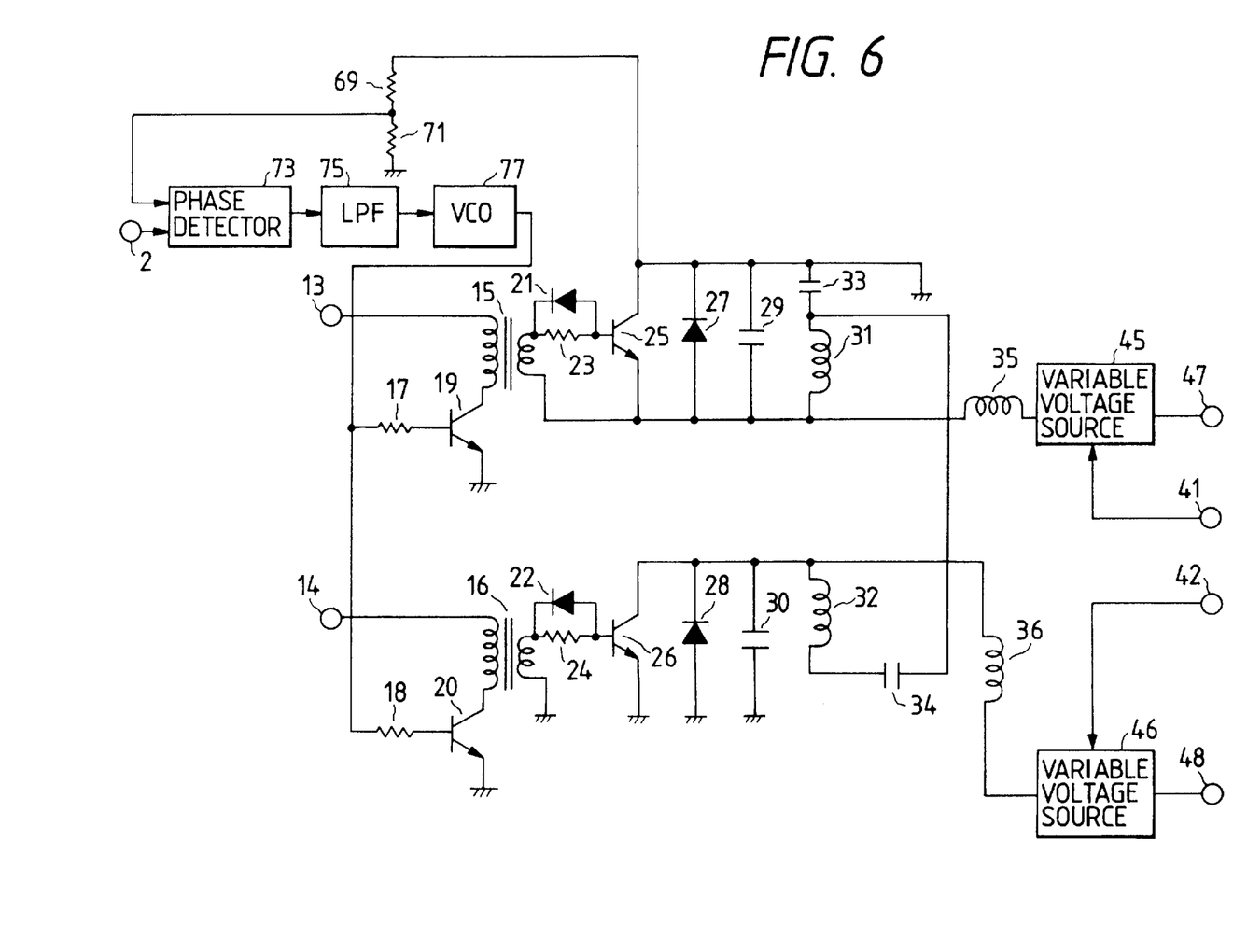
FIG. 6 is a schematic diagram showing a principal portion of the horizontal deflection circuit according to another embodiment of the present invention.

FIG. 6 shows a principal portion of the horizontal deflection circuit according to another embodiment of the present invention. In FIG. 6, reference numeral 45 denotes a variable voltage source for producing a negative power voltage, 47 is a negative power voltage input terminal, 46 is a variable voltage source for producing a positive power voltage, and 48 is a positive power voltage input terminal. This embodiment operates identically to the embodiment of FIG. 1, with the only difference being the method of power input, and it has the same effectiveness as the embodiment of FIG. 1.

Figure 7:
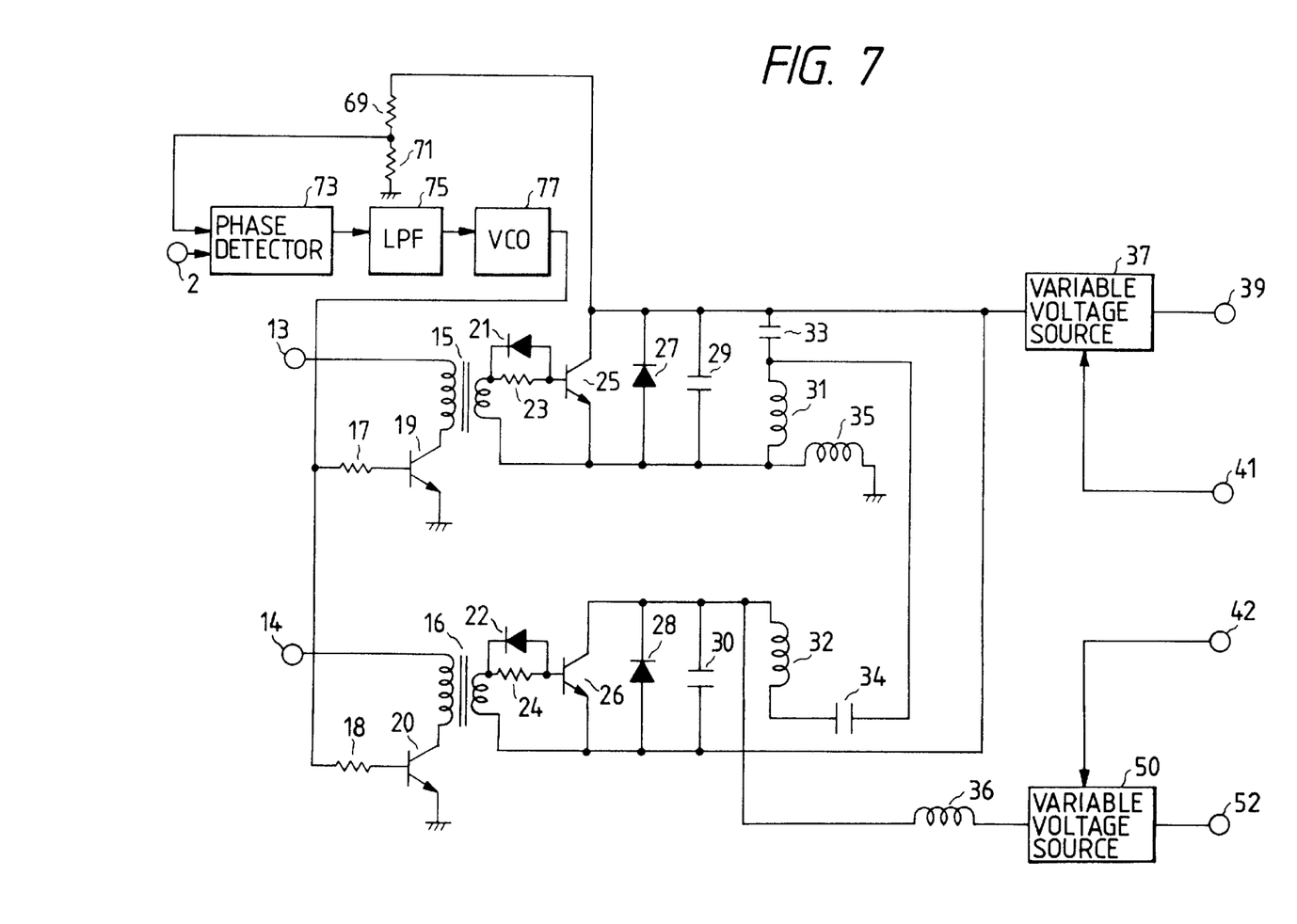
FIG. 7 is a schematic diagram showing a principal portion of the horizontal deflection circuit according to a further embodiment of the present invention.

FIG. 7 shows a principal portion of the horizontal deflection circuit according to another embodiment of the present invention. In FIG. 7, reference numeral 50 denotes a variable voltage source for producing a second positive power voltage, and 52 is an input terminal for the second positive power voltage. This embodiment operates identically to the previous embodiments, with the only difference from the previous embodiments being the method of power input, and it has the same effectiveness as the previous embodiments.

Figure 8:
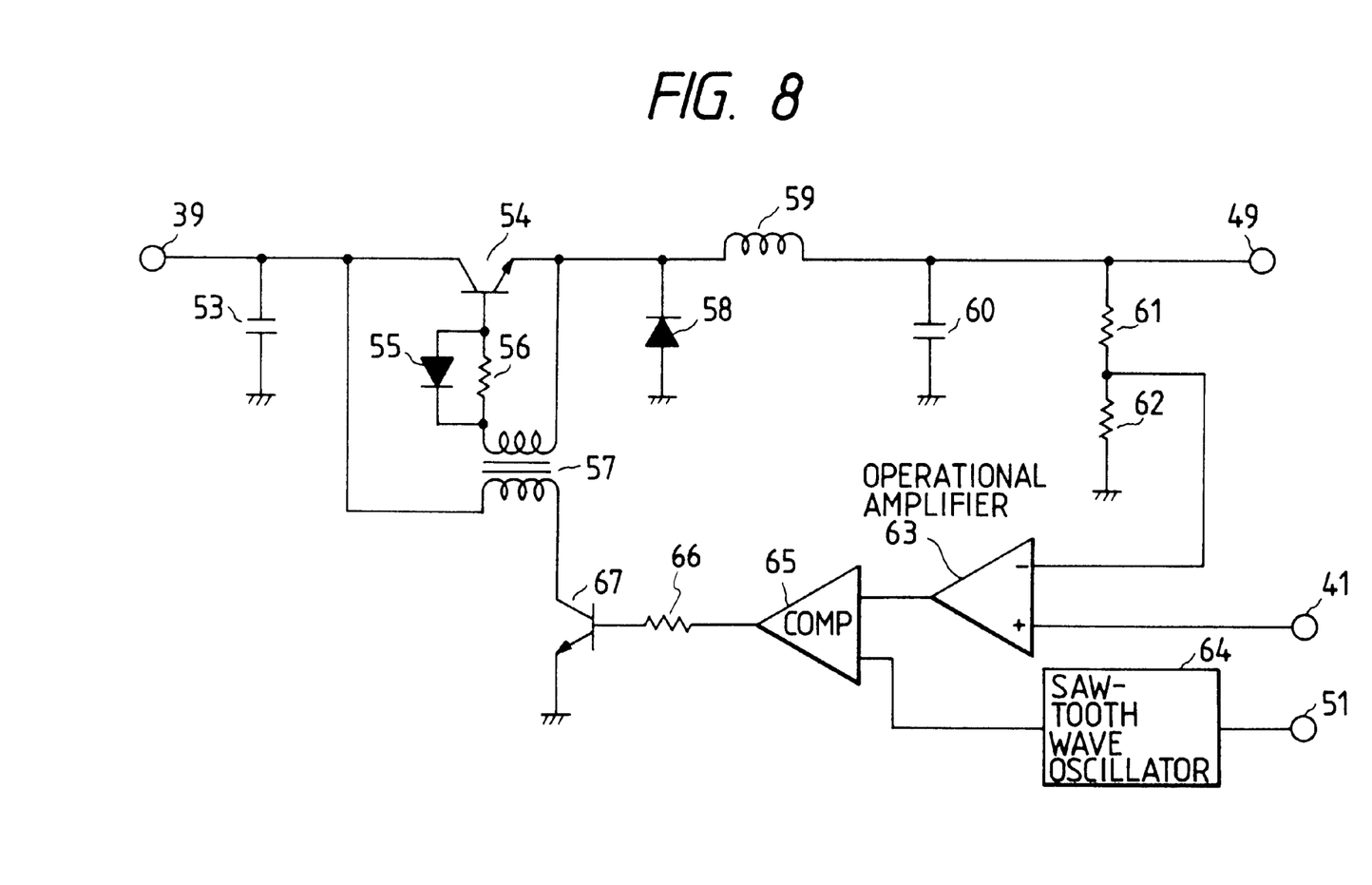
FIG. 8 is a schematic diagram showing an example of a variable voltage source for producing a positive power voltage for use in the embodiments of FIG. 1, FIG. 6 or FIG. 7.

FIG. 8 is a schematic diagram showing an example of the variable voltage source for producing a positive power voltage shown in FIG. 6 or FIG. 7. In FIG. 8, reference numeral 49 denotes an output voltage terminal, 51 is a horizontal sync signal input terminal, 53 and 60 are capacitors, 54 is a switching transistor, 55 and 58 are diodes, 56, 61, 62 and 66 are resistors, 59 is a coil, 63 is an operational amplifier, 64 is a saw-tooth wave oscillator, 65 is a comparator, and 67 is a drive transistor. The circuit of FIG. 8 forms a voltage-drop chopper of the pulse-width modulation type, and it operates to control the on-period of the switching transistor 54 such that the voltage on the output voltage terminal is proportional to the control voltage received on the control voltage input terminal 41. Accordingly, by feeding a control voltage, which is proportional to the horizontal deflection frequency, to the control voltage input terminal 41, the circuit operates to produce a voltage on the output voltage terminal in proportion to the horizontal deflection frequency.

Figure 9:
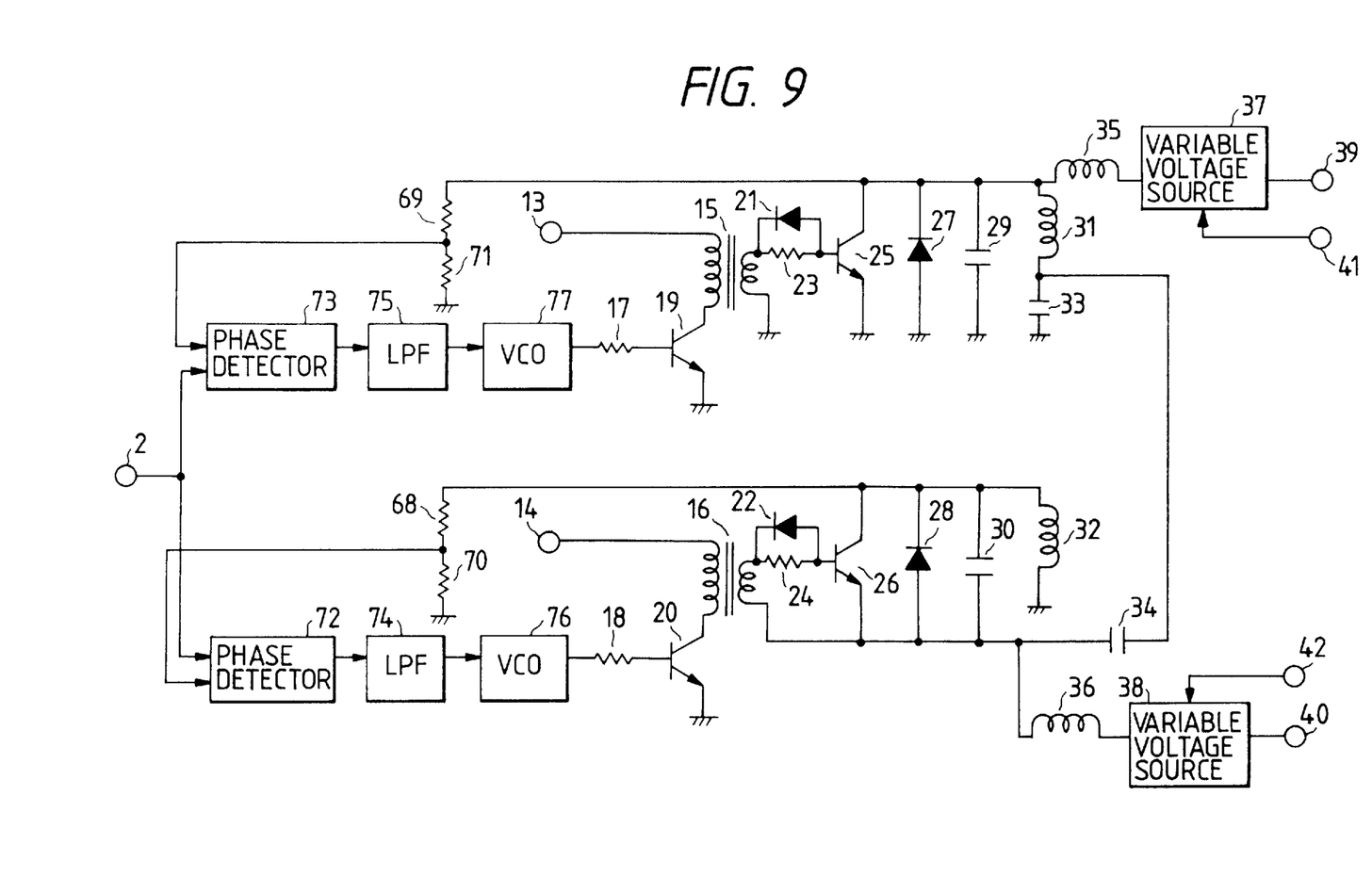
FIG. 9 is a schematic diagram showing a principal portion of the horizontal deflection circuit according to another embodiment of the present invention.

FIG. 9 shows a principal portion of the horizontal deflection circuit according to another embodiment of the present invention. In FIG. 9, reference numeral 68, and 70 are resistors, 72 is a phase detector, 74 is a low-pass filter, and 76 is a voltage-controlled oscillator. This embodiment enables the horizontal sawtooth wave current $I_H'$ flowing in the coil 32 to be brought in-phase with the horizontal deflection current $I_H$ flowing in the horizontal deflector coil 31, and it is particularly effective for higher horizontal deflection frequencies. Namely, the previous embodiments can possibly have the horizontal sawtooth wave current $I_H'$ in the coil 32 out of phase with the horizontal deflection current $I_H$ in the horizontal deflector coil 31, and although such a phase deviation is relatively less influential for lower horizontal deflection frequencies, it cannot be neglected for higher horizontal deflection frequencies, causing a problem in carrying out the continuous S-shape correction accurately. In contrast, this embodiment is constructed to make the horizontal sawtooth wave current $I_H'$ flowing in the coil 32 and the horizontal deflection current $I_H$ flowing in the horizontal deflector coil 31 in-phase with each other, thereby to solve the above-mentioned problem.

In FIG. 9, the phase detector 72 receives a voltage which is the collector pulse of the output transistor 26 divided by the resistors 68 and 70 and the horizontal sync signal supplied to the horizontal sync signal input terminal 2, and a phase-locked loop circuit which brings both inputs in-phase with each other is formed. As a result, the horizontal sawtooth wave current $I_H'$ flowing in the coil 32 becomes in-phase with the horizontal deflection current $I_H$ flowing in the horizontal deflector coil 31 irrespective of the horizontal deflection frequency. Consequently, a horizontal deflection circuit capable of performing the multi-scan compatible and accurate continuous S-shape correction even for higher horizontal deflection frequencies is obtainable.

Figure 10:
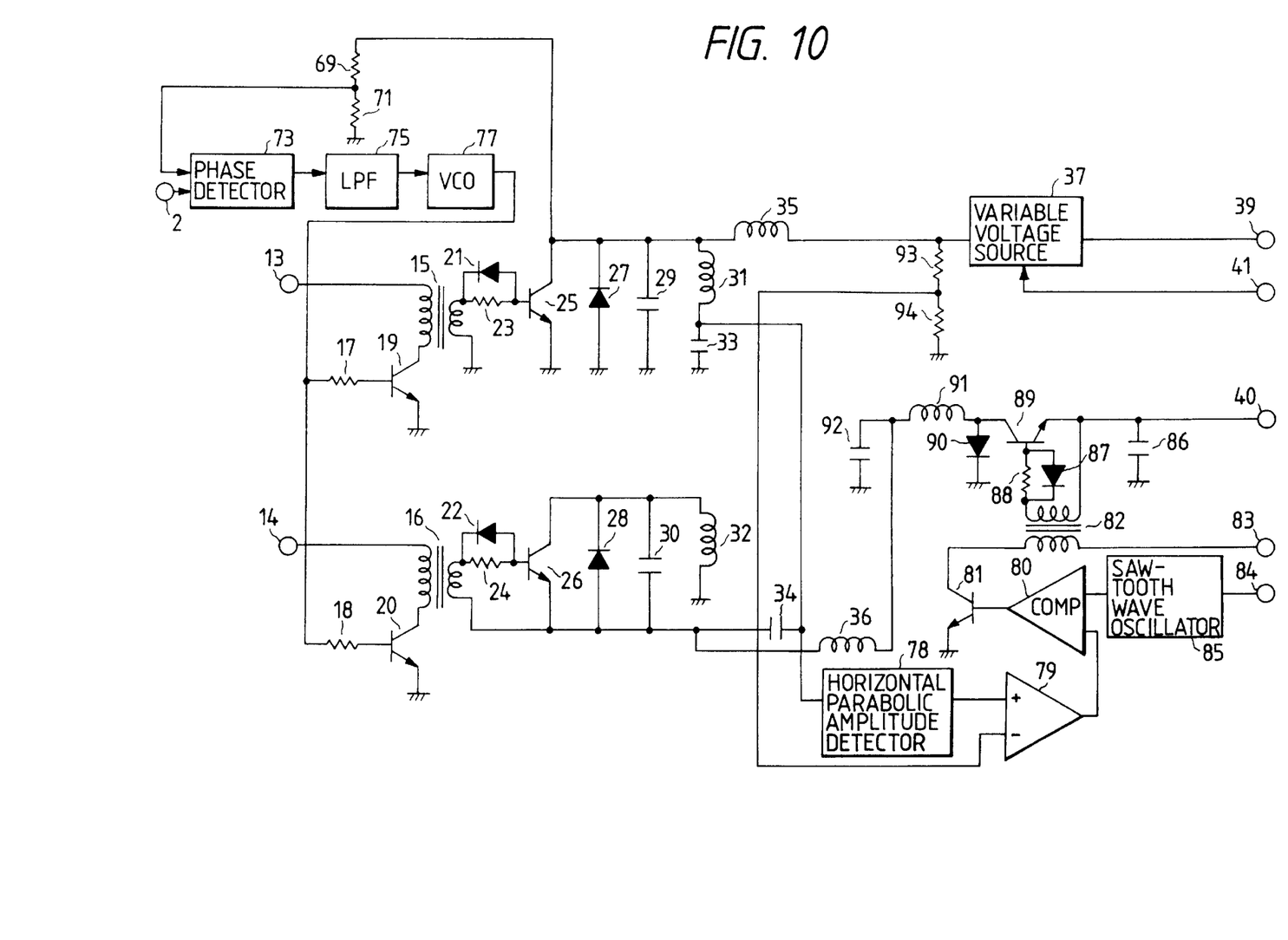
FIG. 10 is a schematic diagram showing a principal portion of the horizontal deflection circuit according to a further embodiment of the present invention.

FIG. 10 shows a principal portion of the horizontal deflection circuit according to a further embodiment of the present invention. In FIG. 10, reference numeral 78 denotes a horizontal parabolic amplitude detection circuit, 79 is an operational amplifier, 80 is a comparator, 81 is a transistor, 82 is a drive transformer, 83 is a power input terminal, 84 is a horizontal sync signal input terminal, 85 is a saw-tooth wave oscillator, 86 and 92 are capacitors, 87 and 90 are diodes, 88, 93 and 94 are resistors, 89 is a switching transistor, and 91 is a coil. This embodiment enables elimination for the control voltage supplied to the control voltage input terminal. Namely, in contrast to the previous embodiments, in which the variable voltage source operates based on the control voltage received on the control voltage input terminal 42 to produce a power voltage corresponding to the horizontal deflection frequency, this embodiment produces a power voltage which corresponds to the horizontal deflection frequency automatically instead of using the control voltage supplied to the control voltage input terminal 42.

In FIG. 10, the operational amplifier 79 has its inverted input terminal supplied with the output voltage of the variable voltage source 37 divided by the resistors 93 and 94 and its non-inverted input terminal supplied with a d.c. voltage which corresponds to the amplitude of the horizontal parabolic voltage of the S-shape capacitor 33 provided by the horizontal parabolic amplitude detection circuit 78, and delivers the output voltage to the comparator 80. The comparator 80 has another input terminal receiving the horizontal sawtooth wave voltage from the saw-tooth wave oscillator 85, and it produces an output voltage that is pulse-width modulated.

The pulse-width modulated voltage drives the switching transistor 89 through the drive transformer 82, and a negative d.c. voltage which is determined from the pulse width is obtained across the capacitor 92. This negative d.c. voltage determines the amplitude of the horizontal sawtooth wave current flowing in the coil 32, and accordingly the ratio (i.e., S-shape correction factor) between the output voltage of the variable voltage source 37 (average voltage of the S-shape capacitor) and the horizontal parabolic voltage amplitude becomes constant automatically irrespective of the horizontal deflection frequency. Consequently, a horizontal deflection circuit capable of performing the multi-scan compatible, continuous S-shape correction is obtainable.

Figure 11:
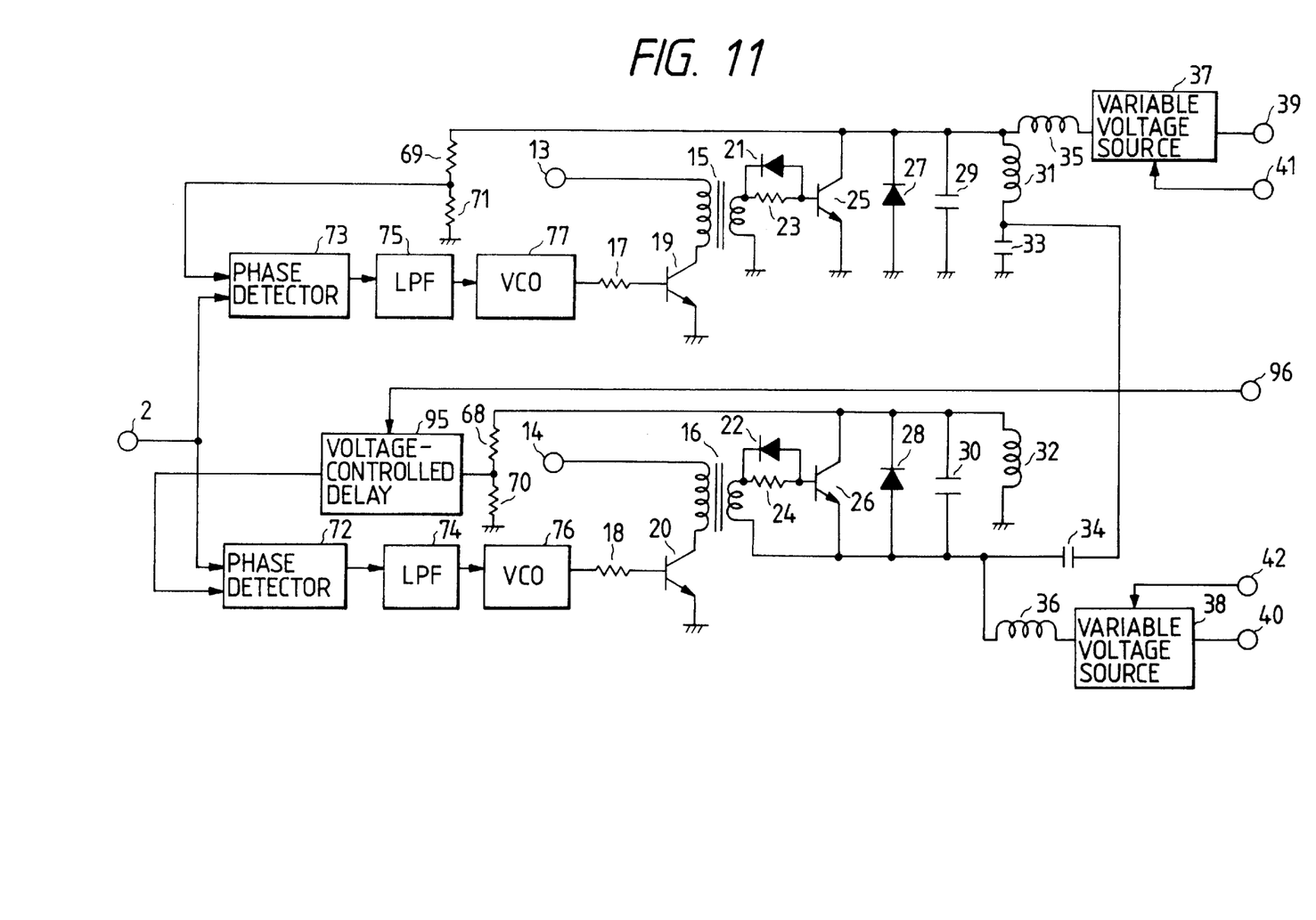
FIG. 11 is a schematic diagram showing a principal portion of the horizontal deflection circuit according to yet another embodiment of the present invention.

FIG. 11 shows a principal portion of the horizontal deflection circuit according to another embodiment of the present invention. In FIG. 11, reference numeral 95 denotes a voltage-controlled delay circuit, 96 is a control voltage input terminal, and the remainder of the circuit is identical to the arrangement of FIG. 9. The voltage-controlled delay circuit 95 is supplied with the collector pulse of the output transistor 26 divided by the resistors 68 and 70 so that it has a delay depending on the control voltage supplied to the control voltage input terminal and the output voltage is delivered to the phase detector 72, thereby making the phase difference between the horizontal sawtooth wave current and the horizontal deflection current to be a constant proportion irrespective of the horizontal deflection frequency. As a result, the horizontal parabolic voltage of the S-shape capacitor becomes asymmetric for its right and left portions, and a horizontal deflection circuit capable of performing the multi-scan compatible, linearity correction and continuous S-shape correction at the same time is obtainable.

Figure 12:
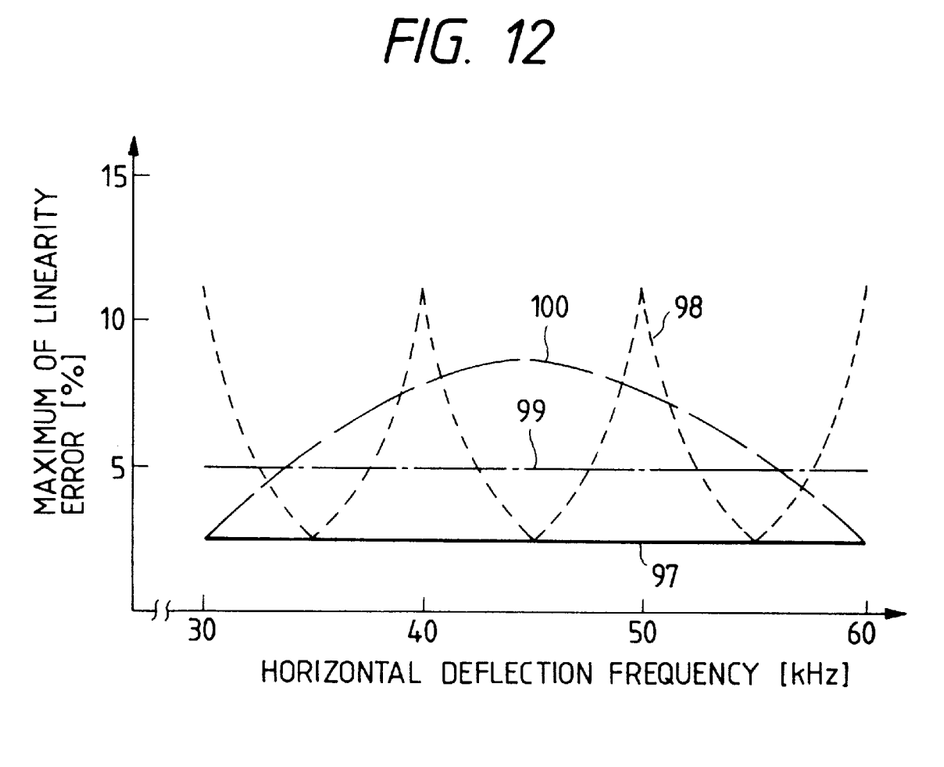
FIG. 12 shows characteristic curves of horizontal linearity error according to the prior art arrangements and the present invention.

FIG. 12 shows characteristic curves of horizontal linearity error according to the prior art arrangements as described above and the present invention based upon experiments for a horizontal frequency range of 30 kHz to 60 kHz for a maximum of horizontal linearity error wherein the horizontal linearity error is given by the following Expression (2).

$$(|x-xm|/xm) \times 100 \qquad (2)$$

where x is a length of a vertical line in a display apparatus and xm is a mean value of x.

In FIG. 12, the ordinate is the maximum of linearity error (%) and the abscissa is the horizontal deflection frequency (kHz). Curve 98 is the result of the scheme of the switching of the S-shape capacitor as described, for example, in Japanese patent application Laid-Open No. 4-74065 wherein the switching frequencies are 40 kHz and 50 kHz. The capacitance of the S-shape capacitor is suitable at 35 kHz, 45 kHz, and 55 kHz, but as shown, there is a large and variable error at all other frequencies. Curve 99 is a result of the scheme based on the saturable reactors as described, for example, in Japanese Patent Application Laid-Open No. 62-31269. This scheme provides a constant value error about 5% because the characteristics of the saturable reactors differ from one another and the ideal characteristic. Curve 100 is a result of the scheme where the amplitude of the sawtooth wave current is proportional to the horizontal deflection frequency as described, for example, in U.S. Pat. No. 4,645,985. As shown, if the amplitude of the horizontal sawtooth wave current is suitable at the highest horizontal deflection frequency of 60 kHz and at the lowest horizontal deflection frequency of 30 kHz, there is a large and variable error at other frequencies since the amplitude of the sawtooth wave current is proportional to the horizontal deflection frequency. However, curve 97 which is a result of the present invention provides a constant error of about 2.5% irrespective of the horizontal deflection frequency because the amplitude of the difference current flowing in the S-shape capacitor is proportional to the horizontal deflection frequency raised to the power N, where N is 2 or the square of the horizontal deflection frequency.

According to the present invention, as described above, the horizontal deflection circuit is provided with the horizontal sawtooth wave current generation circuit, the S-shape capacitor in series connection with the horizontal deflector coil is supplied with a horizontal sawtooth wave current in a direction opposite to the horizontal deflection current, and the horizontal sawtooth wave current generation circuit has its power voltage controlled such that the amplitude of the difference current flowing in the S-shape capacitor is proportional to the square of the horizontal deflection frequency, and consequently the horizontal parabolic voltage of the S-shape capacitor becomes proportional to the horizontal deflection frequency and the ratio to the average voltage of the S-shape capacitor (S-shape correction factor) becomes constant irrespective of the horizontal deflection frequency as shown in curve 97 of FIG. 12. As a result, a horizontal deflection circuit capable of performing the multi-scan compatible, continuous S-shape correction is obtainable.

Furthermore, according to the present invention, the horizontal deflection circuit is provided with two phase-locked loop circuits for making the horizontal sawtooth wave current and horizontal deflection current in-phase with the horizontal sync signal so that the horizontal sawtooth wave current and horizontal deflection current are in-phase with each other irrespective of the horizontal deflection frequency, whereby a horizontal deflection circuit capable of performing the multi-scan compatible, continuous S-shape correction accurately even for higher horizontal deflection frequencies is obtainable.

Furthermore, according to the present invention, the phase-locked loop circuit dealing with the phases of the horizontal sync signal and horizontal sawtooth wave current in the horizontal deflection circuit is provided with a voltage-controlled delay circuit and it is controlled so that the phase difference between the horizontal sawtooth wave current and horizontal deflection current is a constant proportion irrespective of the horizontal deflection frequency, whereby a horizontal deflection circuit capable of performing the multi-scan compatible, linearity correction and continuous S-shape correction at the same time is obtainable.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. An apparatus for generating a deflection current in a deflection winding at a selected frequency, comprising:

means for receiving an input signal at a frequency that is related to the selected frequency;

means responsive to the input signal and coupled to the deflection winding for producing the deflection current at the selected frequency;

an S-capacitance for developing a parabolic voltage that is coupled to the deflection winding to provide S-correction; and a source of current for generating a generally sawtooth current that is coupled to the S-capacitance so that the current flowing in the S-capacitance has an amplitude proportional to a horizontal deflection frequency raised to a power N, where N is a value greater than 1, thereby enabling continuous S-shape correction irrespective of changes in the horizontal deflection frequency.

2. An apparatus according to claim 1, where the value of N is between 1 and 3.

3. An apparatus according to claim 2, where the value of N is 2 so that the amplitude of the current flowing in the S-shape capacitance is proportional to the square of the horizontal deflection frequency.

4. A horizontal deflection circuit comprising:

first horizontal oscillation circuit means for producing a first horizontal oscillation signal synchronous with an externally applied horizontal sync signal;

first horizontal deflection drive circuit means for amplifying the first horizontal oscillation signal to produce a first horizontal drive pulse;

horizontal deflection output circuit means including a horizontal deflector coil and an S-shape capacitor connected in series with the horizontal deflector coil for supplying a horizontal deflection current to the horizontal deflector coil and the S-shape capacitor in accordance with the first horizontal drive pulse;

horizontal sawtooth wave current generation circuit means for supplying a horizontal sawtooth wave current to the S-shape capacitor in a direction opposite to the horizontal deflection current, the horizontal sawtooth wave current generation circuit means having a power voltage thereof controlled so that a difference current between the horizontal deflection current and the horizontal sawtooth wave current flowing in the S-shape capacitor has an amplitude proportional to a horizontal deflection frequency raised to a power N, where N has a value greater than 1, thereby enabling continuous S-shape correction independent of changes in the horizontal deflection frequency.

5. A horizontal deflection circuit according to claim 4, wherein N has a value between 1 and 3.

6. A horizontal deflection circuit according to claim 4, wherein N has a value of 2 so that the difference current flowing in the S-shape capacitor has an amplitude proportional to the square of the horizontal deflection frequency.

7. A horizontal deflection circuit according to claim 4, further comprising means for supplying positive polarity power voltage to the horizontal deflection output circuit means and means for supplying negative polarity power voltage to the horizontal sawtooth wave current generation circuit means.

8. A horizontal deflection circuit according to claim 4, further comprising means for supplying negative polarity power voltage to the horizontal deflection output circuit means and means for supplying positive polarity power voltage to the horizontal sawtooth wave current generation circuit means.

9. A horizontal deflection circuit according to claim 4, further comprising means for supplying power voltages of one of positive polarity and negative polarity to both the horizontal deflection output circuit means and the horizontal sawtooth wave current generation circuit means.

10. A horizontal deflection circuit according to claim 4, wherein the first horizontal oscillation circuit means, the first horizontal deflection drive circuit means and the horizontal deflection output circuit means are coupled so as to form a first phase-locked loop circuit for causing the horizontal deflection current to be in-phase with the horizontal sync signal.

11. A horizontal deflection circuit according to claim 10, wherein the output of the first horizontal oscillation circuit means is supplied to the first horizontal deflection drive circuit means and the horizontal sawtooth wave current generation circuit means.

12. A horizontal deflection circuit according to claim 10, further comprising a second horizontal oscillation circuit means for producing a second horizontal oscillation signal synchronous with the externally applied horizontal sync signal and for applying an output to the horizontal sawtooth wave current generation circuit and for providing therewith a second phase-locked loop circuit for causing the horizontal sawtooth wave current to be in-phase with the horizontal sync signal, thereby enabling the horizontal deflection current and the horizontal sawtooth wave current to be in-phase with each other independent of the horizontal deflection frequency.

13. A horizontal deflection circuit according to claim 4, further comprising a second horizontal oscillation circuit means for producing a second horizontal oscillation signal synchronous with the externally applied horizontal sync signal, a second horizontal deflection drive means for amplifying the second horizontal oscillation signal to produce a second horizontal drive pulse for application to the horizontal sawtooth wave generation circuit, and a voltage controlled delay circuit provided at a front stage of the horizontal sawtooth wave generation circuit means, the first horizontal oscillation circuit means, first horizontal deflection drive circuit means and horizontal deflection output circuit means forming a first phase-locked loop circuit for causing the horizontal deflection current to be in-phase with the horizontal sync signal, the second horizontal oscillation circuit means, second horizontal deflection drive circuit means, horizontal sawtooth wave current generation circuit means and voltage controlled delay circuit forming a second phase-locked loop circuit for controlling the amount of delay of the voltage controlled delay circuit such that a phase difference between the horizontal sync signal and the horizontal sawtooth wave current becomes a constant proportion independent of the horizontal deflection frequency, a phase difference between the horizontal deflection current and the horizontal sawtooth wave current being maintained at the constant proportion independent of the horizontal deflection frequency, thereby enabling linearity correction and continuous S-shape correction with changes in the horizontal deflection frequency.

14. A cathode-ray tube display apparatus comprising a horizontal deflection circuit according to claim 4, and a cathode-ray tube coupled to the horizontal deflection circuit.

15. A horizontal deflection circuit comprising:

horizontal oscillation circuit means for producing a horizontal oscillation signal synchronous with an externally applied horizontal sync signal;

horizontal deflection drive circuit means for amplifying the horizontal oscillation signal to produce a horizontal drive pulse;

horizontal deflection output circuit means including a horizontal deflector coil and an S-shape capacitor connected in series with the horizontal deflector coil for supplying a horizontal deflection current to the horizontal deflector coil and S-shape capacitor in accordance with the horizontal drive pulse;

horizontal sawtooth wave current generation circuit means for supplying a horizontal sawtooth wave current to the S-shape capacitor in a direction opposite to the horizontal deflection current;

detection circuit means for detecting an amplitude of a horizontal parabolic voltage appearing across the S-shape capacitor and for producing a voltage in accordance with the detected amplitude;

means for controlling a power voltage of the horizontal sawtooth wave current generation circuit means so that a ratio of the output voltage of the detection circuit means and the power voltage of the horizontal deflection output circuit means have a constant proportion independent of the horizontal deflection frequency, thereby enabling continuous S-shape correction with changes in the horizontal deflection frequency.

16. A cathode-ray tube display apparatus comprising a horizontal deflection circuit according to claim 15, and a cathode-ray tube coupled to the horizontal deflection circuit.

17. An apparatus according to claim 1, wherein the apparatus is a display apparatus having the deflection winding therein, the deflection winding having the deflection current flowing therein.

* * * * *